Patented July 1, 1941

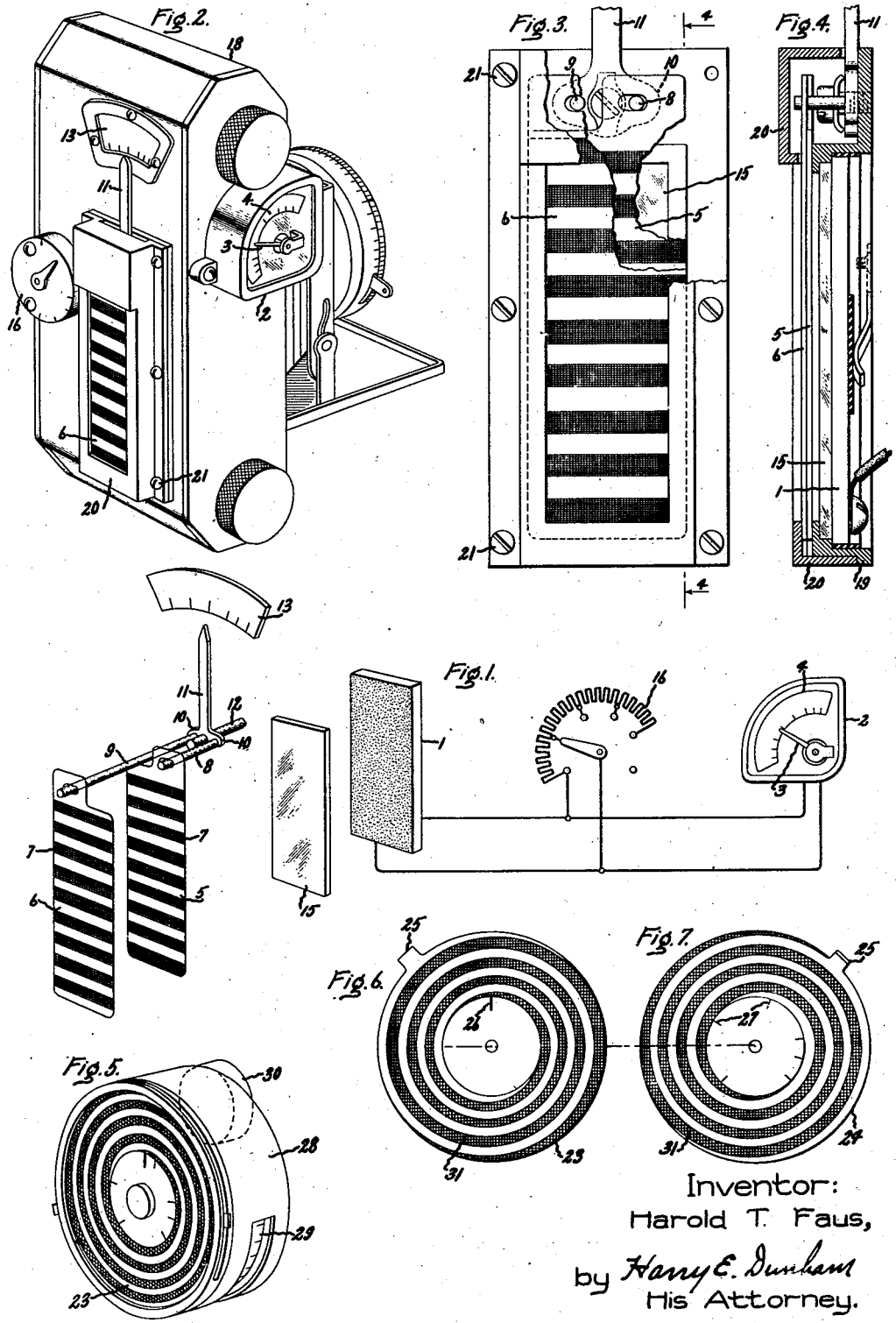

2,247,805

UNITED STATES PATENT OFFICE 2,247,805

LIGHT OR EXPOSURE METER

Harold T. Faus, Lynn, Mass., assignor to General Electric Company, a corporation of New York Application August 25, 1939, Serial No. 291,927

3 Claims. (Cl. 88—23)

My invention relates to light meters and photographic exposure meters. For such meters it is common to employ a photo-electric device of the self-generating type and an indicating electrical instrument connected in circuit therewith. One of the difficulties in constructing such apparatus is in producing an instrument which provides a sufficiently wide range of indication since the values of illumination to be measured range from one foot-candle, or less, to thousands of foot-candles. The use of an instrument having a congested upper scale range is helpful to a certain extent in extending the range, but this is not entirely satisfactory since the range is too great adequately to be covered by a single scale. Another expedient to extend the range is the use of one or more resistors connected in shunt with the instrument but their usefulness is limited by the fact that at high illuminations the cell characteristics change so that the output per lumen decreases rapidly. This change in cell characteristics also limits the use of multipliers consisting of iris diaphragms or other devices which block off part of the cell surface. Where screens or filters are used to reduce the light uniformly over the cell area by a certain factor, there is the difficulty that a different filter or combination of filters must be used for each multiplying factor. Moreover, filters can not be interchanged rapidly and are likely to be lost.

It is the object of my invention to provide an improved light or exposure meter which is simple in construction, reliable and efficient in operation, and avoids the above-mentioned difficulties.

In accordance with my invention I employ, briefly stated, a photo-electric device, an indicating instrument connected therewith, and means for varying the amount of light reaching the device comprising a light valve providing a multiplicity of small adjustable openings and a light-dispersing member between the valve and the photo-electric device. The light valve functions as a multiplier and the light-diffusing member serves to cause the light which passes through the small openings of the valve to produce a substantially even distribution of illumination on the photo-electric device. When the meter is used as a light meter, a scale and cooperating pointer, whose position changes with the size of the light openings of the valve, indicates various multiplying factors which are to be applied to the instrument reading, which may be in units of foot-candles or lumens. When the meter is used as an exposure meter, the scale of the light valve preferably is calibrated in units of camera lens opening and the instrument scale is calibrated in units of exposure time.

My invention will be better understood from the following description taken in connection with the accompanying drawing, and its scope will be pointed out in the appended claims.

Referring to the drawing, Fig. 1 is a combined circuit diagram and exploded view of one embodiment of my invention; Fig. 2 shows this embodiment applied to a small folding camera; Fig. 3 is a side elevation drawn to a larger scale of the light valve shown in Fig. 2; Fig. 4 is a cross-sectional view taken on the line 4—4 of Fig. 3; Fig. 5 is a perspective view showing a modification; and Figs. 6 and 7 are detailed views of the modification shown by Fig. 5.

In Fig. 1, the photo-electric device is represented as being of the self-generating type, such for example as that disclosed in the McCune Patent No. 2,156,734. Connected in circuit with the device 1 and responsive thereto is the electrical indicating instrument 2, having the pointer 3 and the cooperating scale 4. Arranged in front of the photo-electric device 1 is the light valve by which light is admitted to the device in the form of a multiplicity of narrow variable width bands. The bands are formed by a pair of oppositely movable strips 5 and 6, which provide similar light-transmitting portions. The strips 5 and 6 may comprise opaque members having a number of transverse narrow slots therein, but I prefer to employ for this purpose strips of transparent material, such for example as Celluloid, which have the narrow spaced opaque bands 7, leaving transparent bands therebetween. For shifting the strips 5 and 6 in opposite directions, I have provided the rods 8 and 9 which pass through suitable openings in the upper ends of the strips and which are secured to the oppositely extending ears 10 on the pointer 11 which is pivotally mounted on the shaft or screw 12. The upper end of the pointer cooperates with the scale 13. Thus, as the pointer is moved in one direction or the other, the two strips 5 and 6 move in opposite directions whereby the transparent portions of one strip register more or less with the transparent portions of the other strip.

Arranged between the strips 5 and 6 and the photo-electric device 1 is the light-diffusing member 15 which, for example, may be ground glass, opal glass, or a translucent plastic material. The purpose of the member 15 is to so diffuse the light passing through the transparent bands of the strips that it produces a substantially uniform illumination of the photo-electric device

1. Moreover, when the transparent portions of the two strips are in exact alignment, only about one-half of the possible light reaches the photoelectric device, and as these strips are shifted, the light reaching the device may be reduced substantially to zero.

When the apparatus is to be used as a light meter, the scale 4 of the instrument 2 will be graduated in units of illumination such as footcandles or lumens. The scale 13 will then be graduated in multiplying factors which are to be applied to the readings of the instrument 2. When the meter is to be used as an exposure meter, the scale 4 of the instrument preferably will be calibrated in units of exposure time or shutter speed, and the scale 13 will be calibrated in units of camera lens opening, commonly termed "f" values. When the meter is used as an exposure meter, I employ in addition the variable shunt 16 across the instrument 2, the purpose of which is to vary the calibration of the instrument in accordance with the speed of the film being used in the camera.

In Fig. 2, I have shown the form of my invention illustrated by Fig. 1 as applied to the small folding camera 18. The photo-electric device and the light valve in this case are attached to the rear face of the camera and are arranged to receive the incident light rather than the light reflected from the subject being photographed, as is the usual practice. The instrument 2 and the rheostat 16 may be arranged in any convenient manner, these elements being shown, for example, as mounted on a side face and the rear face respectively of the camera.

Referring now particularly to Figs. 3 and 4 where I have shown the photo-electric device and the light valve drawn to a larger scale, the light-diffusing member 15 and the photo-electric device 1 are mounted in the casing 19, fitted to which is the cover 20 enclosing the strips 5 and 6 and forming guides therefor together with the operating mechanism and a portion of the pointer 11, the casing and its cover being suitably secured to the camera by the screws 21.

In the modified form of my invention illustrated by Figs. 5, 6, and 7, the cooperating members comprising the light valve are in the form of the two transparent disks 23 and 24, each of which has an ear or handle 25 and has an opaque band 31 in the form of a spiral. When these two disks are superposed one upon the other and turned relatively to each other, the transparent portions of the two disks will register more or less in accordance with the direction of movement; hence the amount of light which passes through the two disks can be varied in the same manner as in the form of my invention shown by Fig. 1. The angular position of the one disk with respect to that of the other is indicated by the reference mark 26 on the disk 23 with respect to the graduations 27 on the other disk. A photo-electric device, not shown, and of circular form, is mounted within the casing 28 and behind the disks 23 and 24. Between the photo-electric device and the disks is a light-dispersing member, not shown, also of circular form. The indicating instrument is also mounted within the casing 28 and has its pointer cooperating with the scale 29, seen through an opening in the casing, and the rheostat 30 corresponding to the rheostat 16 of Fig. 1 is shown mounted on the rear face of the apparatus. As shown in Fig. 5, the disks 23 and 24 are mounted on the front side of the casing with the ears 25 projecting through slots in the casing at the front edge thereof whereby the disks are readily turned with respect to each other.

The modified form of my invention shown by Fig. 5, like that form represented by Fig. 1, may be used either as a light meter or as an exposure meter, depending upon the manner of calibrating the scales of the electrical instrument and the light valve.

I have chosen the particular embodiments described above as illustrative of my invention, and it will be apparent that various other modifications may be made without departing from the spirit and scope of my invention, which modifications I aim to cover by the appended claims.

What I claim as new and desire to secure by Letters Patent of the United States, is:

1. An exposure meter comprising an enclosing casing having a window, a photo-electric device in said casing, a light valve engaging said window and a light diffusing plate between said device and said valve, said valve comprising relatively movable plates having cooperating light openings therein, the outermost plate having a smooth exterior surface thereby avoiding the collection of dust in the light openings thereof.

2. An exposure meter comprising an enclosing casing having a window, a photo-electric device in said casing, a light valve engaging said window and a light diffusing plate between said device and said valve, said valve comprising a pair of cooperating smooth plates having thereon transparent and opaque bands and means engaging said plates by which they may be moved simultaneously in opposite directions.

3. An exposure meter comprising an enclosing casing having a window, a photo-electric device in said casing, a light valve engaging said window and a light diffusing plate between said device and said valve, said valve comprising a pair of cooperating smooth circular plates having thereon transparent and opaque spiral bands, one of said plates being provided with means by which it may be adjusted rotatively to vary amount of light admitted to said device.

HAROLD T. FAUS.